United States Patent
Spader et al.

(10) Patent No.: US 10,782,218 B2
(45) Date of Patent: Sep. 22, 2020

(54) SYSTEM FOR VERIFICATION OF TESTING MACHINE SPEED

(71) Applicant: ILLINOIS TOOL WORKS INC., Glenview, IL (US)

(72) Inventors: Howard Spader, Attleboro, MA (US); Daniel Caesar, South Boston, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 214 days.

(21) Appl. No.: 16/023,036

(22) Filed: Jun. 29, 2018

(65) Prior Publication Data
US 2020/0003669 A1    Jan. 2, 2020

(51) Int. Cl.
*G01N 3/62* (2006.01)
*G01P 21/02* (2006.01)
*G01P 3/64* (2006.01)
*G01P 3/50* (2006.01)

(52) U.S. Cl.
CPC ...................................... *G01N 3/62* (2013.01)

(58) Field of Classification Search
CPC ... G01N 3/62; G01P 21/02; G01P 3/64; G01P 3/50
See application file for complete search history.

(56) References Cited

U.S. PATENT DOCUMENTS

2011/0158283 A1* 6/2011 Meyerson ................ G01K 1/02 374/163
2016/0349036 A1* 12/2016 Hashmi ............... G01M 99/002

FOREIGN PATENT DOCUMENTS

DE   3417016   12/1985
DE   4016481   11/1991

OTHER PUBLICATIONS

"Laureate Series 2 Counter / Timer / Serial Input Meter Owners Manual"; Rev Aug. 27, 2015; Copyright 1999-2015, Laurel Electronics, Inc.*
"Heidenhain ND 287 Operating Instructions"; Jul. 2016 Version 03.*
Anonymous, "Standard Practices for Verification of Speed for Material Testing Machines" ASTM E2658; Jan. 1, 2015; pp. 1-10, XP055598823, West Conshohocken, PA, DOI: 10.1520/E2658 Retrieved from the Internet: URL: http://www.astm.org/cgi-bin/resolver.cgi?E2658 [retrieved on Jun. 24, 2019] p. 1-p. 5.
International Search Report issued in PCT/US2019/026291 dated Jul. 5, 2019.

* cited by examiner

*Primary Examiner* — Daniel S Larkin
*Assistant Examiner* — Anthony W Megna Fuentes
(74) *Attorney, Agent, or Firm* — McCarter & English, LLP

(57) ABSTRACT

The present disclosure relates to a system for verification of the speed of crosshead travel in a materials testing device. A linear displacement device is mounted on the crosshead of the materials testing device. The linear displacement device measures the displacement of the crosshead during the test. A timer interval counter measures the time of travel of the crosshead during the test. This measurements allow for accurate calculation of the speed of the crosshead travel.

12 Claims, 5 Drawing Sheets

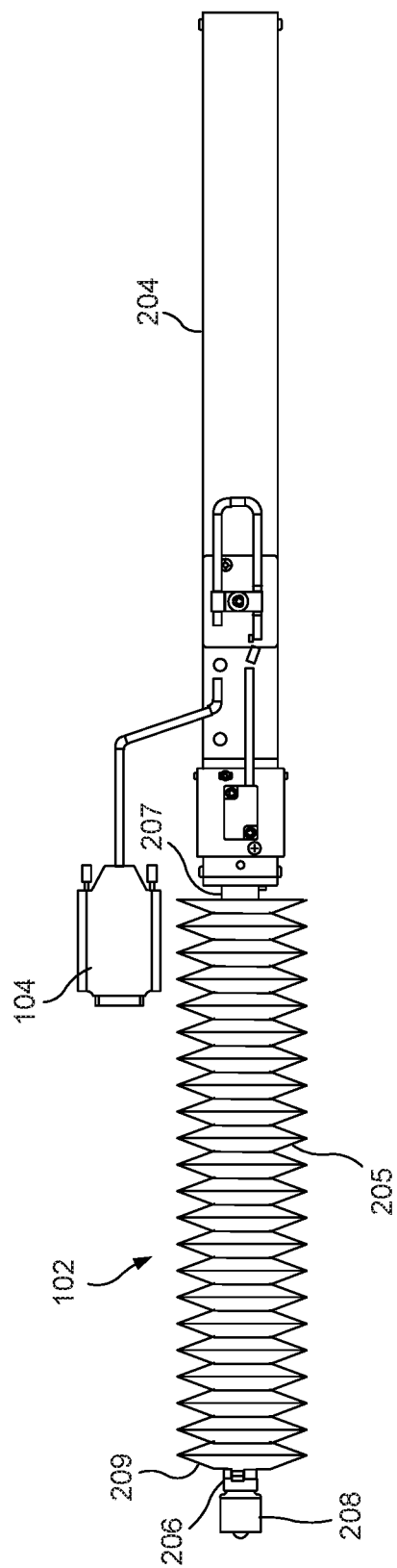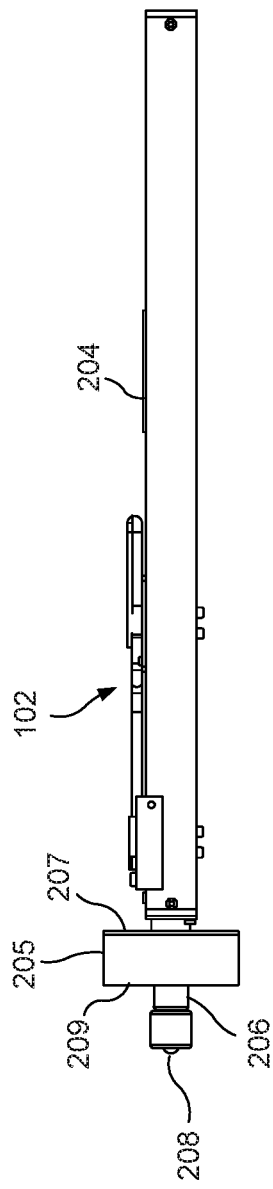
FIG. 6A
FIG. 6B

SYSTEM FOR VERIFICATION OF TESTING MACHINE SPEED

BACKGROUND OF THE DISCLOSURE

Field of the Disclosure

The present disclosure relates to a system for verification of the speed of crosshead travel in a materials testing device.

Description of the Prior Art

In the prior art, it is known that material testing, such as, but not limited to stress/strain analysis pursuant to ASTM E2658, requires repeatable and predictable testing machine speed. The devices used for measurement of machine speed may be used for measurement of crosshead speed. The accuracy of the crosshead speed value is imperative for the accuracy of the materials testing results.

OBJECTS AND SUMMARY OF THE DISCLOSURE

It is therefore an object of the present disclosure to provide for improved calculation and verification of the speed of a crosshead in a materials testing device.

This and other objects are attained by verification of crosshead travel by measuring the distance the crosshead travels over a period of time. A time internal counter is used in combination with a linear displacement device which is mounted on the crosshead of the testing machine. Both devices are calibrated and provide metrological traceability to the International System of Units (SI) through a recognized National Metrology Institute such as the National Institute of Standards and Technology.

BRIEF DESCRIPTION OF THE DRAWINGS

Further objects and advantages of the disclosure will become apparent from the following description and from the accompanying drawings, wherein:

FIG. 6A is a plan view of an embodiment of the linear displacement device of an embodiment of the present disclosure in an extended configuration.

FIG. 6B is a plan view of an embodiment of the linear displacement device of an embodiment of the present disclosure in a retracted configuration.

DETAILED DESCRIPTION OF THE PREFERRED EMBODIMENTS

Figure 1:
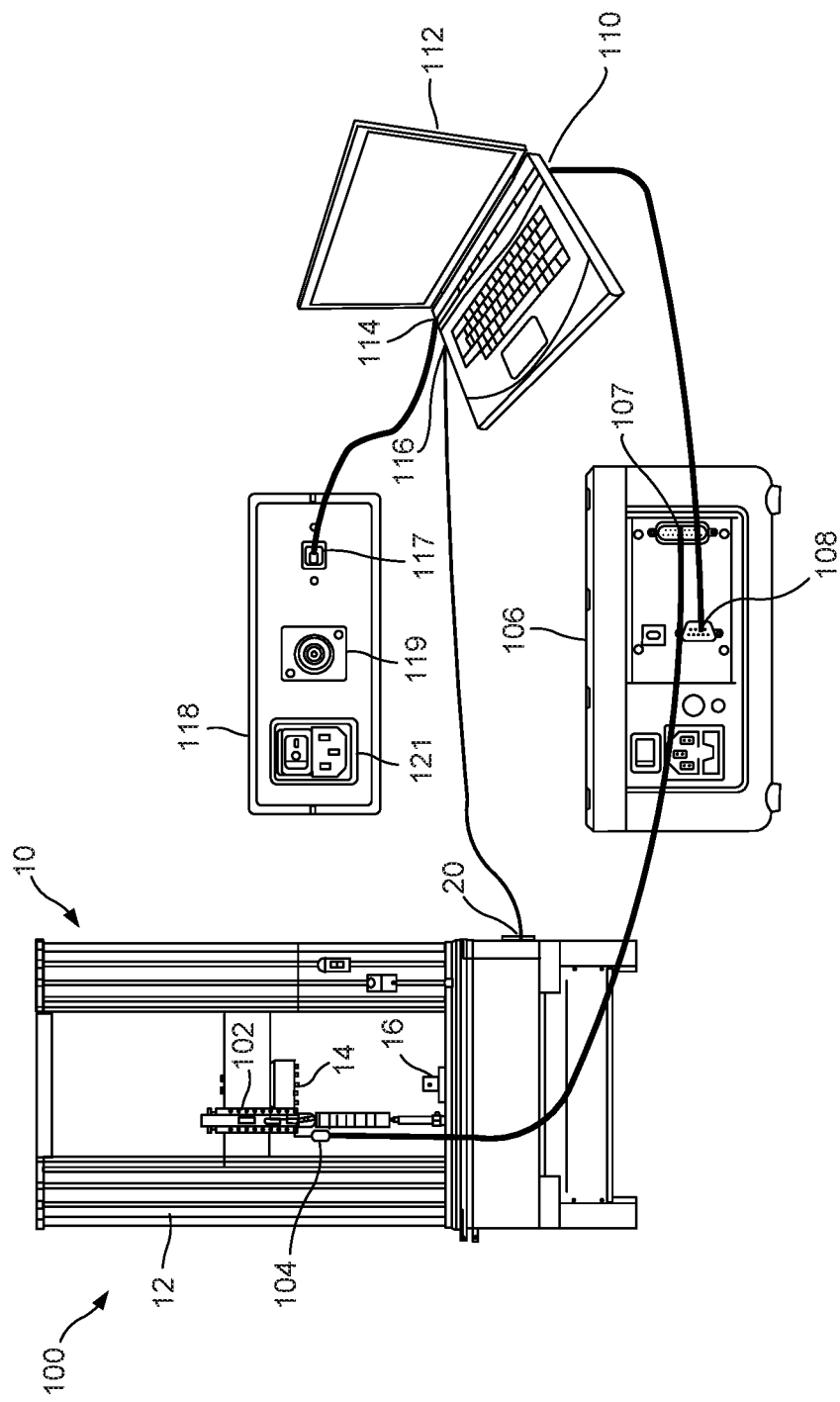
FIG. 1 is a schematic of an embodiment of the system of the present disclosure.
Figure 2:
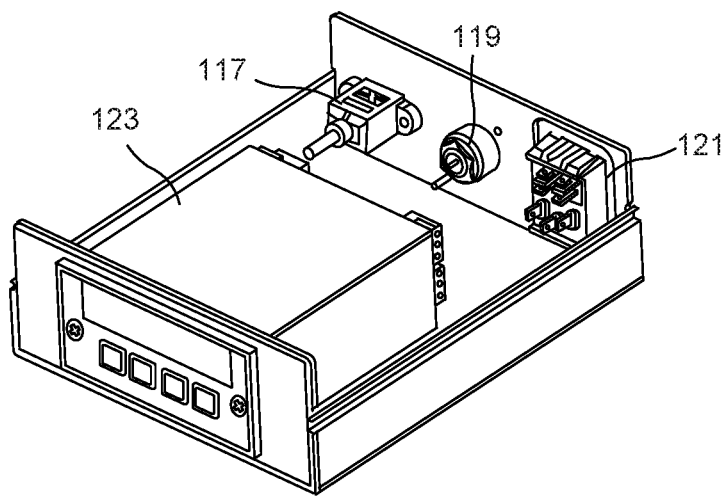
FIG. 2 is a top perspective view of the time interval meter of an embodiment of the system of the present disclosure.
Figure 3:
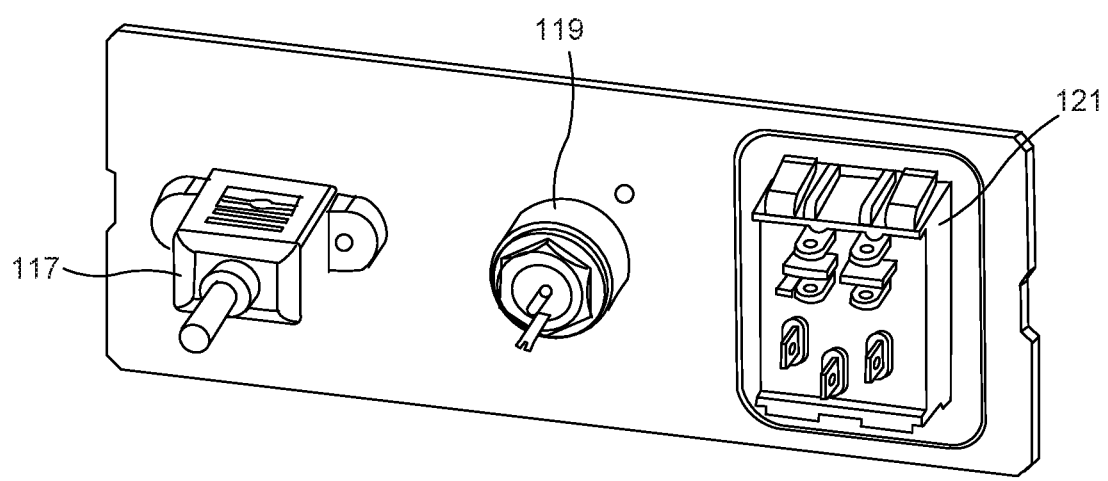
FIG. 3 is a perspective view of the internal face of the back panel of the timer interval meter of an embodiment of the system of the present disclosure.
Figure 4:
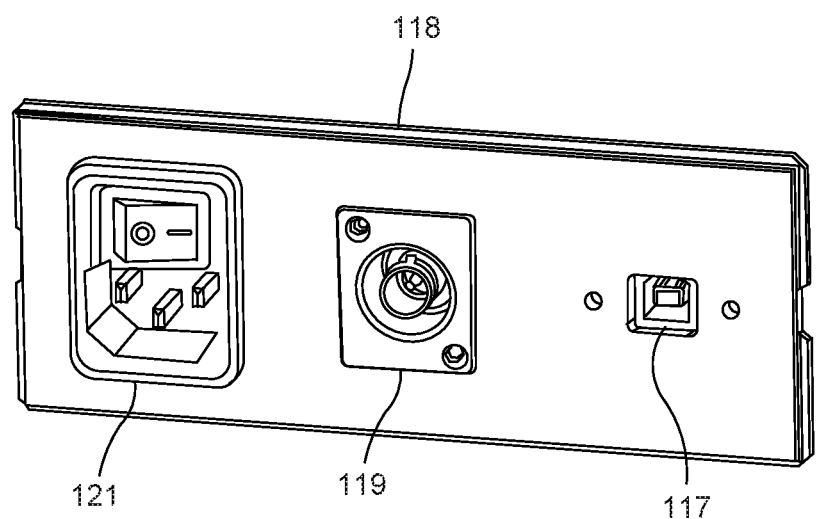
FIG. 4 is a perspective view of the external face of the back panel of the timer interval meter of an embodiment of the system of the present disclosure.
Figure 5:
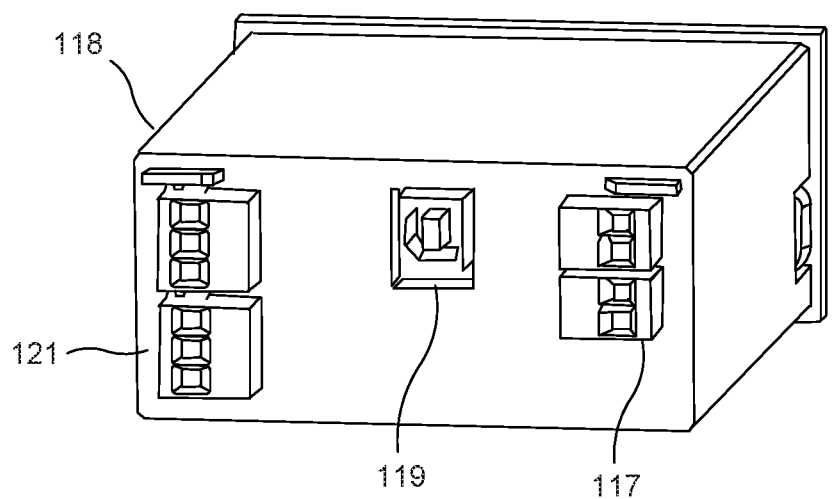
FIG. 5 is a perspective view of the rear of the timer interval meter of an embodiment of the system of the present disclosure.

Referring now to the drawings in detail, wherein like numerals indicate like elements throughout the several views, one sees that FIG. 1 is a schematic of the system 100. A materials testing machine 10, such as, but not limited to a stress/strain measuring device, is provided. Materials testing device 10 typically includes a frame 12 and further includes first and second jaws 14, 16 which grip a specimen or testing sample and impart a load or stress upon the sample, thereby resulting in strain of the sample. The correlation between stress and strain, as well as thresholds for fracture or other failure, are typical results of the materials testing.

A linear displacement device 102 is mounted on the crosshead or other suitable location on the materials testing machine 10 and sends a digital signal representative of linear displacement (typically, but not limited to, via a 15-pin D-type connector 104) to the input 107 of linear encoder 106 (typically, but not limited to, a Heidenhain ND-287). The linear decoder 106 sends a signal via output 108 (typically a 9-pin, D-type connector) to first port 110 (typically, but not limited to, a USB port) of computer 112 (or other processing device) running applications programs (typically, but not limited to, Calpro software). Computer 112 further includes second port 114 (typically, but not limited to, a USB port) connected to port 117 (typically, but not limited to, a USB port) the timer interval counter 118. Computer 112 further includes third port 116 (typically, but not limited to, a USB port) connected to the service port connector 20 of the material testing machine 10, for use when only displacement is being measured.

The timer internal counter 118 comprises a universal dual-channel pulse input counter with interface connections for power, computer software communications and external triggering connection for calibration to national and international standards. The timer interval counter is purchased from Laurel Electronic Inc. in Costa Mesa, Calif. with a specific requirement to function as a time counter and designated as part number L50205FR-INS.

The timer interval counter 118 is used in conjunction with the linear displacement device 102 to provide for in-the-field verification of crosshead and actuator speed on materials testing device 10. It communicates with computer 112 (running materials testing software) which provides the communications and commands necessary to reset, start the counter, stop the counter and read the elapsed time to millisecond. This provides the ability to compare the set speed of the materials testing device 10 to the actual speed derived from the time and displacement measurement reference. The timer interval counter 118 is calibrated using references that will provide traceability of the time measurements to the International System of Units (SI).

The interior of the timer interval counter 118, the interior of the rear panel of timer interval counter 118, the exterior of the rear panel of timer interval counter 118, and the back of the timer interval counter 118 are illustrated in FIGS. 2, 3, 4 and 5, respectively, including port 117 (illustrated as a panel mount USB Cable B to B-F/M, for control and data communications with computer 112 and associated software), jack 119 (illustrated as a 75 ohm recessed BNC jack-to-solder point chassis connector, used for trigger the timer interval counter 118 during calibration) and power entry module receptacle 121, all in communication with the operational module 123 of the timer interval counter 118.

Figure 7:
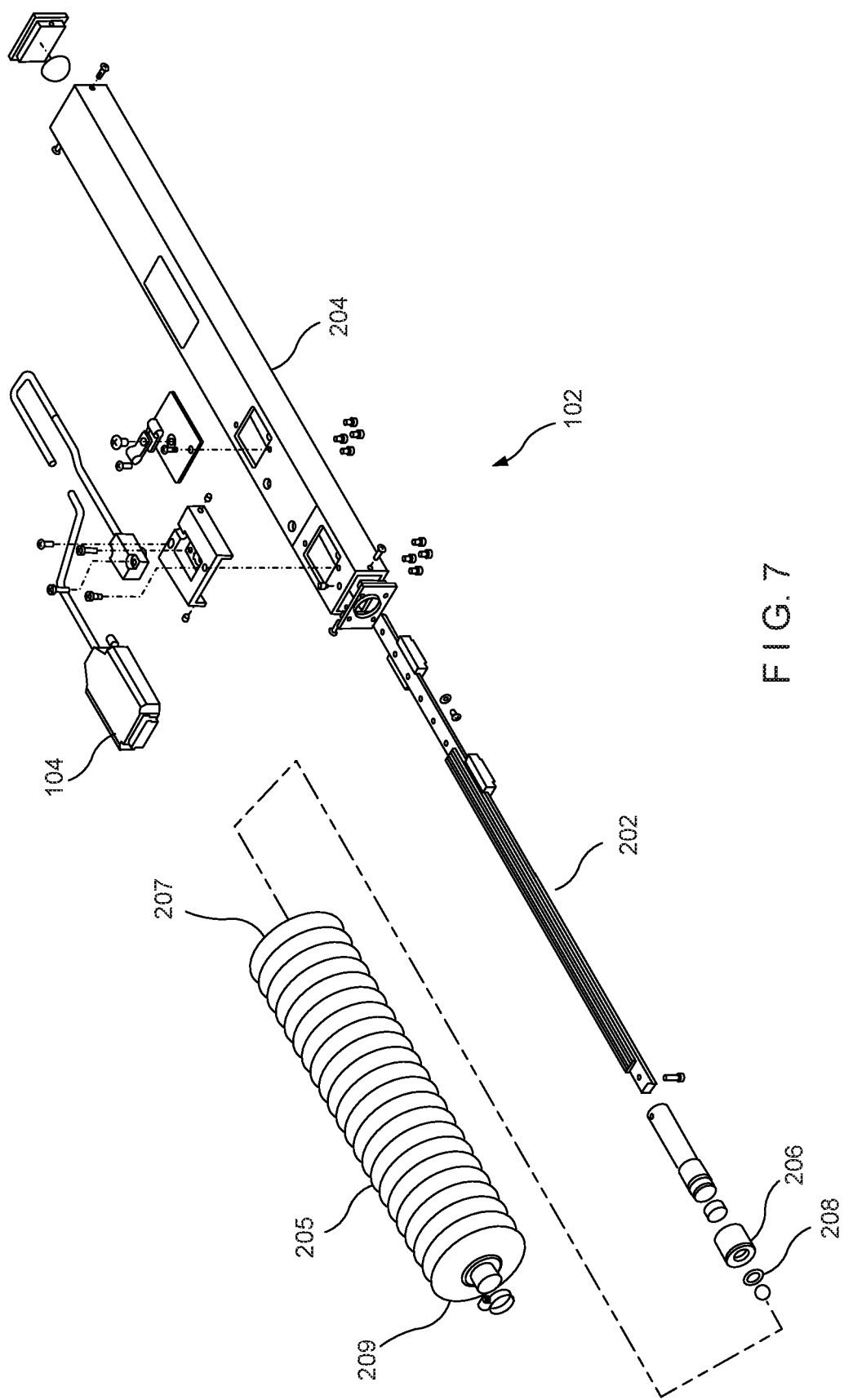
FIG. 7 is an exploded view of an embodiment of the linear displacement device of an embodiment of the present disclosure.

The linear displacement device 102 is illustrated in FIGS. 6A, 6B and 7. A linear probe 202 is slideably mounted and received by chassis 204, and bellows 205. The distal end 206 of linear probe 202 receives tip 208, which engages the crosshead of materials testing machine 10. A first end 207 of bellows 205 is attached to the chassis 204 and a second end 209 of bellows 205 is attached to tip 208. The chassis 204 includes electronics which measures the insertion of linear probe 202 into chassis 204, thereby measuring the linear displacement of tip 208. This linear displacement information is communicated by connector 104 (such as, but not limited to, 15-pin D-type connector 104) as further shown in FIG. 1.

The materials test is initiated by starting movement of the crosshead at a speed set within the control software of the materials testing machine 110. As the crosshead moves, the linear displacement device 102 measures the actual displacement of the crosshead. This displacement is displayed on the linear encoder 106. The user, such as a field service engineer, then initiates the verification in the software of computer 112 at which time the displacement value is read into the software of computer 112 and the time interval counter 118 is initiated. At the completion of the prescribed time, the user stops the test, at which time the displacement as calculated by the linear displacement device 102 is again recorded and the time interval counter 118 is stopped and read into the software of computer 112. The software determines the change in displacement between the two readings of the linear displacement device 106 and divides by the elapsed time of the test, as calculated from readings of the timer interval counter 118, to determine the actual test speed. The software compares the set speed from the machine control software to the actual speed as calculated above to determine the error in the speed of the materials testing machine 110.

Thus, the several aforementioned objects and advantages are most effectively attained. Although preferred embodiments of the invention have been disclosed and described in detail herein, it should be understood that this invention is in no sense limited thereby.

What is claimed is:

1. A method for calculating speed of a crosshead in a materials testing device moving from a starting time to an ending time, including the steps of: providing a linear displacement measuring device mounted on a crosshead of a materials testing device configured to measure linear displacement at the starting time and the ending time and generating a digital signal; providing a computing device configured to calculate an average speed of the crosshead using measured linear displacement and time at the starting time and the ending time; providing a time measuring device configured to measure time at the starting time and the ending time, the time measuring device including a port configured for communicating data, including the starting time and the ending time, to the computing device and the time measuring device further including a port configured to trigger the time measuring device during calibration of the time measuring device; and providing a linear encoder configured to receive the digital signal from the linear displacement measuring device.

2. The method of claim 1 computing device receives an output from the linear encoder.

3. The method of claim 2 wherein the time measuring device is a timer interval counter.

4. The method of claim 3 wherein the timer interval counter is in communication with the computing device.

5. The method of claim 4 wherein the computing device is in communication with the materials testing device.

6. The method of claim 5 wherein the communication between the computing device and the linear encoder, between the computing device and the timer interval counter and between the computing device and the materials testing device is performed by respective first, second and third USB connections.

7. A system for calculating speed of a crosshead in a materials testing device moving from a starting time to an ending time, including: a linear displacement measuring device mounted on a crosshead of a materials testing device configured to measure linear displacement at the starting time and the ending time and generating a digital signal; a computing device configured to calculate an average speed of the crosshead using measured linear displacement at the starting time and the ending time; a time measuring device configured to measure time at the starting time and ending time, the time measuring device including a port configured for communicating data, including the starting time and ending time, to the computing device and the time measuring device further including a port configured to trigger the time measuring device during calibration of the time measuring device; and a linear encoder configured to receive the digital signal from the linear displacement measuring device.

8. The system of claim 7 wherein the computing device receives an output from the linear encoder.

9. The system of claim 8 wherein the time measuring device is a timer interval counter.

10. The system of claim 9 wherein the timer interval counter is in communication with the computing device.

11. The system of claim 10 wherein the computing device is in communication with the materials testing device.

12. The system of claim 11 wherein the communication between the computing device and the linear encoder, between the computing device and the timer interval counter and between the computing device and the materials testing device is performed by respective first, second and third USB connections.

* * * * *